Patented Oct. 13, 1931

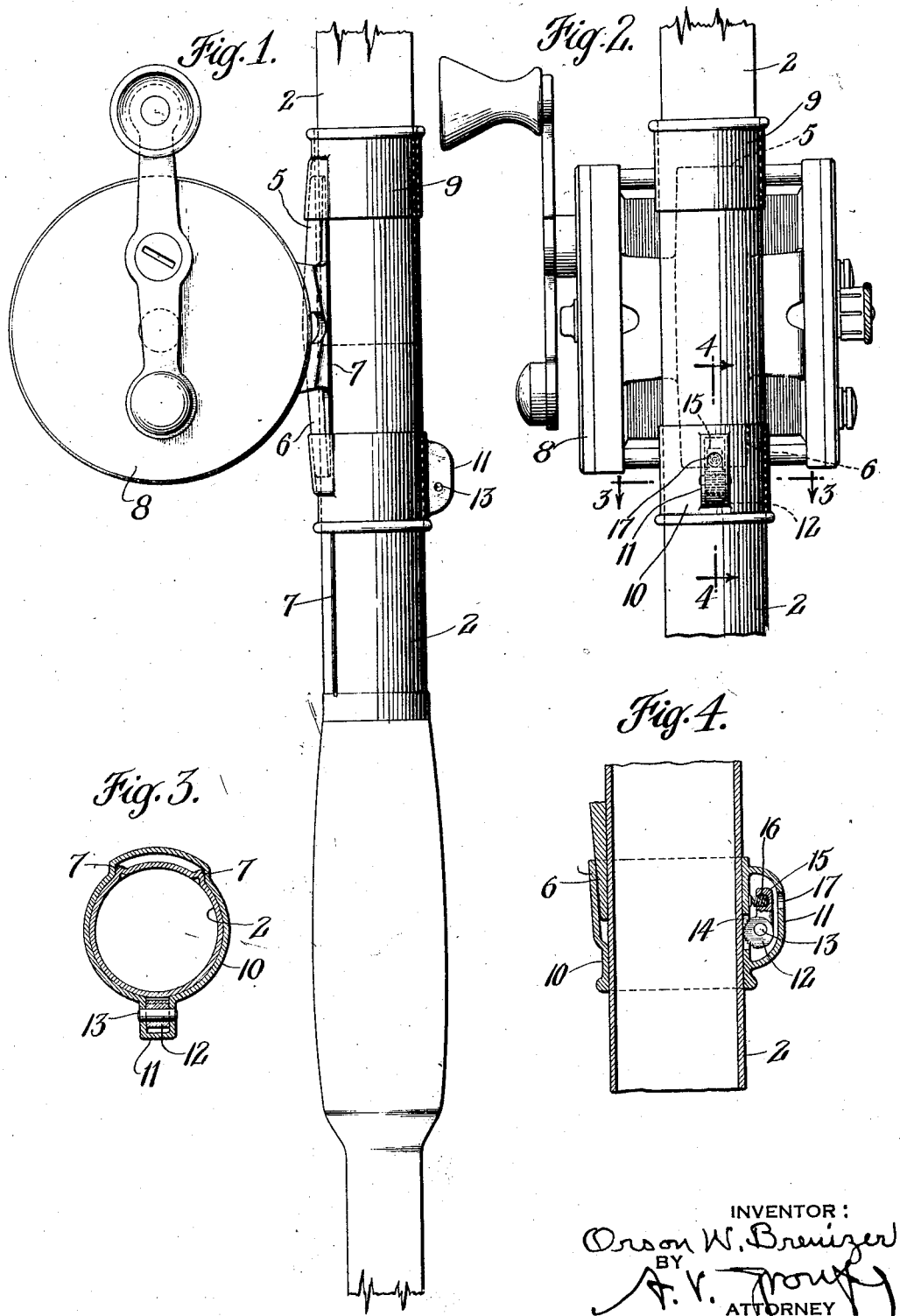

1,827,277

UNITED STATES PATENT OFFICE

ORSON W. BRENIZER, OF PHILADELPHIA, PENNSYLVANIA

REEL CONNECTING MEANS FOR FISHING RODS

Application filed July 10, 1930. Serial No. 466,969.

The object of this invention is to provide a novel simple and efficient means for detachably connecting reels to fishing rods in a manner to permit the reel to be easily and quickly detached from the rod when desired and to hold the reel firmly and securely in place upon the rod without danger of being accidentally detached or loosened when the rod and the reel are in service.

The invention consists of the elements and the combinations of them hereinafter described and claimed.

In the accompanying drawings, illustrating the invention,

Figure 1 is a side view of a portion of a rod, a reel, and my improved means for detachably connecting the reel to the rod.

Figure 2 is a view of parts shown in Fig. 1, as viewed from the right hand side of Fig. 1.

Figure 3 is a sectional detail of the reel connecting means, on line 3—3 of Fig. 2.

Figure 4 is a sectional detail of the reel connecting means, on line 4—4 of Fig. 2.

Referring to the drawings, 2 designates a portion of a fishing rod and 8 a reel thereon.

The frame structure of the reel 8 includes two oppositely projecting parts 5 and 6 which extend longitudinally of the rod 2 and which are made tapering or wedge shaped, being reduced in thickness toward their free ends.

These projecting parts 5 and 6 are fitted against the outer surface of the rod 2 between two longitudinally extending ribs 7 formed thereon to prevent lateral displacement of the reel 8. One part 5 is inserted into a pocket formed between the rod 2 and the expanded or raised portion of a collar or member 9 which is fixed to and, in effect, forms a part of the rod.

The other part 6 is contained within a pocket formed between the rod 2 and an expanded or raised portion of a sleeve or collar 10 which surrounds the rod 2 and the part 6 and is slidably fitted to the rod to be moved longitudinally thereon.

The sleeve or collar 10 is provided with a hollow projection or housing 11 containing an eccentric 12 which is pivoted thereto by means of a suitable pin or shaft 13 which extends transversely through the eccentric 12 and the side walls of the housing. The eccentric 12 extends through an opening 14 in the collar 10 or inner wall of the housing 11 and it is provided with suitable peripheral teeth which are adapted to engage and bind against the body of the rod 2.

The main body of the eccentric 12 extends from its pivot 13 in a direction away from the collar or member 9, and the eccentric 12 is provided with an arm 15 which extends toward the member 9. The arm 15 is confined within the housing 11 and interposed between it and the collar 10 or inner wall of the housing 11 is a spring 16 which exerts outward pressure against the arm 15 and thereby tends to turn the eccentric 12 to bring the main body thereof between the pivot 13 and the rod 2 and thus cause the eccentric to bind against the rod and prevent the sleeve or collar 10 from moving away from the member 9, while permitting the collar to be moved toward the member.

The spring 16 is inserted into a cavity in the arm 15, and is held in proper working relation to the arm 15 and collar 10 by the walls of the cavity; and the spring 16, arm 15 and eccentric 12 may be inserted into the housing 11 through the opening 14 from the interior of the collar before the collar is applied to the rod 2 when the parts are assembled.

The outer wall of the housing 11 has a hole or opening 17 therein opposite the outer side of the arm to permit any convenient part or instrument to be inserted into the housing and pressed against the arm 15 to move it inwardly against the action of the spring 16 to turn the eccentric on its pivot 13 to release the rod 2 from the binding action of the eccentric and thus permit the collar 10 to be moved from the member 9 and from the projecting part 6 of the reel 8, thereby freeing the reel and permitting its projecting part 5 to be withdrawn from the member 9 for the removal of the reel from the rod.

When it is desired to apply the reel to the rod, the projecting part 5 of the reel is first inserted into the member 9, and thereafter the collar 10 is moved longitudinally on the rod toward the member 9 until the collar embraces the reel part 6 and comes into firm engagement therewith and thus locks the reel upon the rod, the eccentric 12 permitting the collar 10 to be moved toward the member 9 and preventing the collar from moving in a reverse direction after the reel has been locked upon the rod, as previously explained.

I claim as my invention:

1. The combination of a rod, a connecting member fixed thereon, a collar slidable on the rod toward and from the member, a reel having parts constructed to be received by said member and said collar and to be thereby secured to the rod when the collar is moved toward the member, an eccentric pivoted on the collar to engage and bind against the rod when turned in one direction and to free the rod when turned in the reverse direction and a spring holding the eccentric in engagement with the rod, the eccentric permitting the collar to be moved toward and preventing it from being moved from the member.

2. The combination of a rod, a connecting member fixed thereon, a collar slidable on the rod toward and from the member, a reel having parts constructed to be received by said member and said collar and to be thereby secured to the rod when the collar is moved toward the member, an eccentric pivoted on the collar to engage and bind against the rod when turned in one direction and to free the rod when turned in the reverse direction, an arm extending from the eccentric and a spring interposed between the arm and a part of the collar and holding the eccentric in engagement with the rod, the eccentric permitting the collar to be moved toward and preventing it from being moved from the member.

3. The combination of a rod, a connecting member fixed thereon, a collar slidable on the rod toward and from the member, a reel having parts constructed to be received by said member and said collar and to be thereby secured to the rod when the collar is moved toward the member, an eccentric pivoted on the collar to engage and bind against the rod when turned in one direction and to free the rod when turned in the reverse direction, an arm extending from the eccentric and having a cavity therein and a spring within said cavity and acting against said arm and a part of the collar and holding the eccentric in engagement with the rod, the eccentric permitting the collar to be moved toward and preventing it from being moved from the member.

4. The combination of a rod, a connecting member fixed thereon, a collar slidable on the rod toward and from the member and having a housing thereon, a reel having parts constructed to be received by said member and said collar and to be thereby secured to the rod when the collar is moved toward the member, an eccentric pivoted on the collar to engage and bind against the rod when turned in one direction and to free the rod when turned in the reverse direction, an arm extending from the eccentric and a spring interposed between the arm and a part of the collar and holding the eccentric in engagement with the rod, said eccentric and said arm being wholly confined within said housing, the wall of said housing opposite to said arm having a hole therein for the insertion of a part to act against the arm to move it against the action of said spring to free the eccentric from binding engagement with the rod, and the eccentric permitting the collar to be moved toward and preventing it from being moved from the member.

5. The combination of a rod, a connecting member fixed thereon, a collar slidable on the rod toward and from the member and having a housing thereon, a reel having parts constructed to be received by said member and said collar and to be thereby secured to the rod when the collar is moved toward the member, an eccentric pivoted on the collar to engage and bind against the rod when turned in one direction and to free the rod when turned in the reverse direction, an arm extending from the eccentric and a spring interposed between the arm and a part of the collar and holding the eccentric in engagement with the rod, said eccentric and said arm being wholly confined within said housing, the part of the collar forming the inner wall of the housing having an opening therein for the insertion of the eccentric and its arm into the housing from the interior of the collar, the outer wall of the housing having a hole therein opposite to said arm for the insertion of a part to act against the arm to move it against the action of said spring to free the eccentric from binding engagement with the rod and the eccentric permitting the collar to be moved toward and preventing it from being moved from the member.

In testimony whereof I affix my signature.

ORSON W. BRENIZER.